United States Patent Office 3,086,144
Patented Apr. 16, 1963

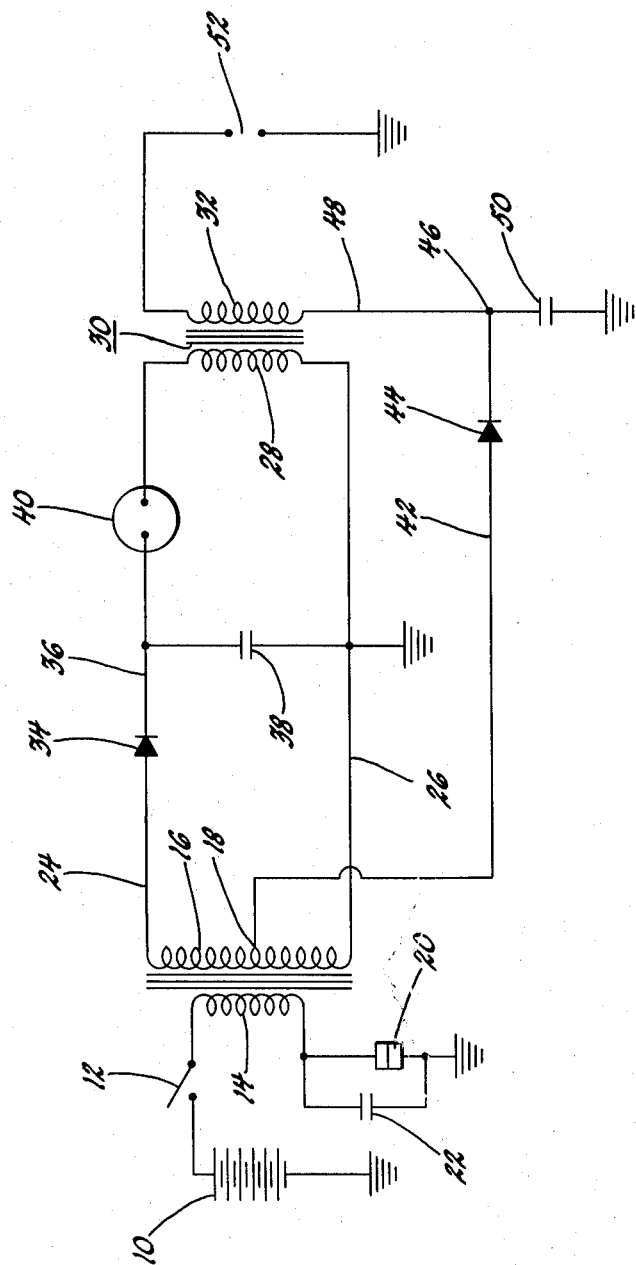

3,086,144
GAS TURBINE IGNITION SYSTEM
Brooks H. Short, Anderson, Ind., assignor to General Motors Corporation, Detroit, Mich., a corporation of Delaware
Filed Mar. 6, 1961, Ser. No. 93,586
3 Claims. (Cl. 315—177)

This invention relates to electric ignition systems and more particularly to ignition systems for igniting the combustible mixture of a gas turbine engine and the like.

One of the objects of this invention is to provide an electrical ignition system that is comprised of relatively few parts and which is therefore economical to manufacture but yet durable in operation.

Another object of this invention is to provide an electrical ignition system that includes a first capacitor for maintaining the spark once it has been initiated.

A further object of this invention is to provide an electrical ignition system that includes an ignition coil having a primary winding and a secondary winding and first and second capacitors, the secondary winding being connected with a spark gap and one of the capacitors and the primary winding being connected with the other capacitor through a circuit element having a prescribed breakdown voltage, the capacitor, being charged from a source of pulsating current through separate rectifier means.

Further objects and advantages of the present invention will be apparent from the following description, reference being had to the accompanying drawings wherein preferred embodiments of the present invention are clearly shown.

In the drawings:

The single figure drawing is a schematic circuit illustration of an ignition system made in accordance with this invention.

Referring now to the drawing, the reference numeral 10 designates a source of direct current power which in this case is a storage battery. It is seen that one side of the storage battery is connected to ground whereas the opposite side of this battery is connected with an ignition switch 12. The ignition switch 12 is connected with a vibrator coil 14 which forms a part of a vibrator-transformer. This vibrator-transformer includes the secondary winding 16 which is tapped at 18 and also includes the vibrator contacts 20 which are connected between the vibrator coil 14 and ground. The capacitor 22 is connected across the vibrator contacts as is clearly apparent from the drawing.

The secondary winding 16 of the vibrator transformer has opposite ends connected with lead wires 24 and 26. It can be seen that the lead wire 26 is grounded and is also connected with the primary winding 28 of an ignition transformer 30. The ignition transformer has a secondary winding designated by reference numeral 32.

The lead wire 24 is connected to one side of a rectifier 34 and the opposite side of this rectifier is connected with lead wire 36. The lead wire 36 is connected to one side of a capacitor 38, the opposite side of this capacitor being connected with lead wire 26 and thus to ground. The lead wire 36 is also connected to one side of a circuit element 40 which has a prescribed breakdown voltage. This circuit element may be, for example, a gas tube that is filled with inert gases and which breaks down when a predetermined voltage is applied across it. It is seen that the opposite side of the circuit element 40 is connected to one side of the primary winding 28 of the ignition coil.

The tap point 18 on the secondary winding 16 is connected with a lead wire 42. The lead wire 42 is connected to one side of a rectifier 44 and the opposite side of this rectifier is connected with junction 46. The junction 46 is connected with lead wire 48 which serves to connect one side of the secondary winding 32 with one side of the capacitor 50. The opposite side of the capacitor is connected to ground. The secondary winding 32 has an opposite side connected with the spark gap 52 which is used to ignite the combustible mixture of an engine. It is seen that one side of the spark gap 52 is connected to ground.

In the operation of the system just described, the ignition switch 12 is closed when it is desired to cause a sparking at the spark plug or spark gap 52. With the ignition switch 12 closed, the vibrator causes a pulsating current to flow in the vibrator coil winding 14 which is stepped up by transformer action of coil winding 14 and secondary winding 16. The current flowing out of the secondary winding 16 is pulsating and charges the capacitor 38 through a circuit that includes the rectifier 34 and lead wire 26. The capacitor 50 is simultaneously charged through a circuit that may be traced from tap point 18, through lead wire 42, through rectifier 44, through capacitor 50 and thence through lead wire 26 back to the lower portion of secondary winding 16.

When the voltage attained by capacitor 38 is high enough, the circuit element 40 breaks down so that the capacitor 38 will discharge through the gap 40 and through the primary winding 28 of the ignition coil. The transient voltage pulse in primary winding 28 is stepped up by the transforming ability of the ignition coil 30 so that a higher voltage appears across the secondary winding 32. This will cause the spark gap 52 to begin to ionize and the condenser 50 will now completely break down the spark gap 52 to maintain a good spark across the spark gap. The discharge of condenser 50 through the secondary winding 32 and through the spark gap 52 gives the spark the required energy and duration.

It is pointed out that capacitor 50 is large as compared to the capacity of capacitor 38 so that most of the energy for firing gap 52 comes from capacitor 50. When the series gap 40 breaks down, a transient is generated in the secondary 32 of the ignition coil. This voltage combined with the voltage across capacitor 50 is sufficient to start conduction at the spark plug.

While the embodiments of the present invention as herein disclosed, constitute a preferred form, it is to be understood that other forms might be adopted.

What is claimed is a follows:

1. An electrical ignition system comprising, an ignition transformer having a primary winding and a secondary winding, a spark discharge device connected with said secondary winding, a source of power, means for transferring energy from said power source to the primary winding of said ignition coil including a first capacitor, a second capacitor connected in series with said secondary winding, and a circuit including a rectifier connecting a junction located between one side of said second capacitor and one side of said secondary winding with said power source.

2. An electrical ignition system comprising, an ignition coil having a primary winding and a secondary winding, a source of pulsating current, a spark discharge device connected with said secondary winding, a first capacitor connected with said source of pulsating current through first rectifier means, a circuit element having a prescribed breakdown voltage connected between said first capacitor and the primary winding of said ignition coil, a second capacitor connected in series with the secondary winding of said ignition coil, and second rectifier means connected between said second capacitor and said source of pulsating current forming a part of a circuit for charging said second capacitor through said second rectifier means.

3. An electrical ignition system comprising, a battery, a vibrator-transformer unit having a vibrator coil and a secondary winding, a first capacitor, said first capacitor having one side thereof connected with one side of said vibrator secondary winding and having an opposite side connected with an opposite side of said vibrator secondary winding through first rectifier means, a circuit element having a prescribed breakdown voltage, an ignition transformer having a primary winding and a secondary winding, means connecting said circuit element between one side of said first capacitor and one side of the primary winding of said ignition coil, a spark discharge device connected with the secondary winding of said ignition coil, a second capacitor connected in series with the secondary winding of said ignition coil, and second rectifier means connected between said second capacitor and a tap point on said vibrator secondary winding.

References Cited in the file of this patent

UNITED STATES PATENTS 2,497,307    Lang _____ Feb. 14, 1950

FOREIGN PATENTS 841,434    Great Britain _____ July 13, 1960